Jan. 9, 1923.

H. J. BLAKESLEE
PYROMETER.
FILED MAR. 22, 1920.

1,441,207

Inventor:
Henry J. Blakeslee
by Harry R. Williams
atty.

Patented Jan. 9, 1923.

1,441,207

UNITED STATES PATENT OFFICE.

HENRY J. BLAKESLEE, OF HARTFORD, CONNECTICUT, ASSIGNOR TO THE STATES COMPANY, OF HARTFORD, CONNECTICUT, A STATUTE CORPORATION OF CONNECTICUT.

PYROMETER.

Application filed March 22, 1920. Serial No. 367,861.

*To all whom it may concern:*

Be it known that I, HENRY J. BLAKESLEE, citizen of the United States, residing at Hartford, in the county of Hartford and State of Connecticut, have invented a new and useful Improvement in Pyrometers, of which the following is a specification.

This invention relates to thermoelectric pyrometers of the potentiometer type, that is, apparatus for measuring high temperatures in which the E. M. F. generated in a thermocouple is opposed by an equal E. M. F. from another source, and the current in the circuit including the source measured and interpreted to indicate the temperature of the thermocouple.

The object of the invention is to provide a compact instrument of this character that is simple to operate and rugged in structure, and which has the several elements so made and connected that changes in temperature and electrical resistance are compensated and errors in measurement normally due thereto reduced to a negligible factor, thereby ensuring at all times and under various conditions of use accuracy in the temperature measurements made with the instrument.

In the pyrometer which forms the subject of this invention the E. M. F. generated in the thermocouple is opposed by a potential due to current from an independent source passing through resistance common to both couple and source circuits, and exact opposition is effected by means of an adjustable rheostat controlling the current from the independent source, and is shown by means of a galvanometer in the couple circuit. Measurement of the thermo E. M. F. is made by means of a current indicating instrument through which the opposition or source current passes, and this instrument is caused to indicate directly in terms of temperature the condition of the hot end of the couple by constructing all parts of its circuit and its calibrating circuit of like metal, and also constructing the resistance provided to establish the accurate opposing E. M. F., in such form, preferably a bridge, and of such materials and so adjusted that variations in the temperature of the resistance will cause changes in the opposing potential equal to the changes in the thermo E. M. F. due to the same temperature changes.

Figure 1:
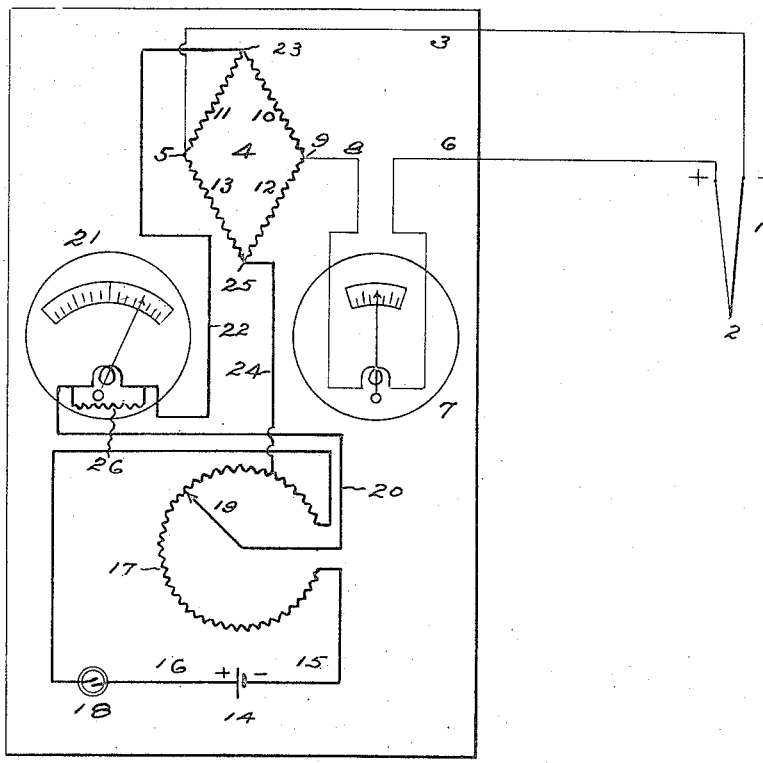
Figure 2:
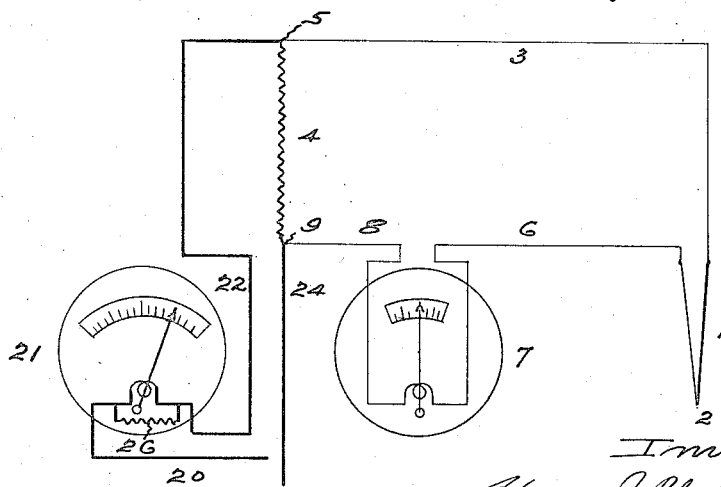

In the accompanying drawings Fig. 1 shows a diagrammatic representation of a pyrometer constructed according to this invention. Fig. 2 shows a modified arrangement of the resistance common to the thermocouple circuit and independent source circuit.

The thermocouple 1 which is designed to have its hot point 2 thrust into a furnace, oven or other chamber, or to be applied to any object or material which it is desired to measure or control the temperature of, may be composed of iron-constantan, chromel-alumel, platinum-iridium, or any other well known materials. One cold end of the couple is connected by a lead 3 with a resistance 4 at the point 5 and the other cold end is connected by a lead 6 with a sensitive galvanometer 7 which by a wire 8 is connected with the resistance at the point 9. This resistance is preferably in the form of a bridge with four legs 10, 11, 12 and 13, as shown in Fig. 1, but may be a straight resistance, as shown in Fig. 2. When the resistance is constructed in the form of a bridge the four legs 10, 11, 12 and 13 are composed of such metals and so adjusted that with a given current flowing through the bridge the difference in potential between the points 5 and 9 will vary directly as the E. M. F. of the thermocouple varies with changes in the temperature of the bridge. This is accomplished by making the arms 11 and 12 of metal having a higher temperature coefficient of resistance than the arms 10 and 13, and adjusting the resistances to the proper relative values.

The independent source of current 14 may be an ordinary electrolytic cell or any other suitable steady source of direct current. This source is connected by circuit wires 15 and 16 with a rheostat or adjustable resistance 17 of common construction. In this circuit is a control switch or push button 18 of simple type. The sliding contact 19 of the rheostat is connected by a wire 20 with a coil of an indicator or deflecting current-measuring instrument 21, the other end of which coil is connected by a wire 22 with the resistance 4, at the point 23, if the resistance is in the form of a bridge, or at 5 if the resistance is straight. A wire 24 connects the rheostat with the other end of the resistance 4, at the point 25 if the resistance is in bridge form, or the point 9 if the straight resistance is used.

The indicator is preferably of the d'Arsonval type, that is, a sensitive galvanometer or millivoltmeter for measuring E. M. F. having a moving coil mounted between poles of a permanent magnet. This indicator measures the current flowing from the source through the resistance that is common to the source circuit and thermocouple circuit, and its scale may be graduated to read in terms of E. M. F. or temperature degrees. A calibrating resistance 26 is connected so as to shunt the winding of the indicator, and this resistance and the winding of the indicator and all intermediate parts of the circuit are made of like metal or metal having like temperature coefficient of resistance.

By properly adjusting the movable contact of the rheostat when the switch is closed a current from the cell may be passed through the circuit, which includes the indicator and bridge resistance, of such value that the potential difference between the points 5 and 9 will exactly equal and oppose the E. M. F. generated in the thermocouple. It is also evident that if the bridge resistances be constant, then always when the thermocouple E. M. F. is exactly opposed by the potential difference between 5 and 9, which condition will be shown by the galvanometer resting at zero, the current flowing through the bridge will be a measure of the thermo E. M. F. generated in the couple, and if the current measuring instrument be calibrated to measure the current flowing from the cell its indications will be a measure of the potential difference between 5 and 9 and the thermo E. M. F. of the couple and therefore of the temperature difference between the hot and cold ends of the couple. Also the instrument may be made to read directly in temperature of the hot end of the thermocouple if certain precautions are taken in the arrangement of the resistances, as will be presently described.

The readings of the indicator should always be a measure of the current passing through the bridge. As the indicator is subject to changes in temperature, due to its surroundings, it should be so constructed that its indications will not be affected by any such changes. Also in order to calibrate the indicator to read correctly in connection with a given thermocouple and bridge it is necessary to adjust the indicator so that its deflection will be suitable for a given temperature range of couple. This may best be accomplished by means of the shunt resistance 26 previously mentioned. If this shunt resistance is of different temperature coefficient from that of the indicator winding or from any metal in the indicator circuit shunted by this resistance, then any change of temperature of the indicator which is accompanied by a change of temperature of the shunt resistance, will cause an error in the reading of the instrument. Therefore, the shunt resistance and all resistance in the indicator circuit shunted by the resistance are composed of the same metal, preferably copper, as the windings of the indicator. This will eliminate errors in the reading due to changes in temperature of the indicator.

The bridge resistance is so constructed that with current passing through it a difference in potential will exist between the points 5 and 9, a condition which also exists with the single straight resistance shown in Fig. 2. However, if a single resistance is used which has a negligible temperature coefficient, then as the temperature of the wire changes the difference in potential between the points of attachment of the couple leads due to a given current will be always the same, and under that condition the instrument would not indicate always the temperature of the hot end of the couple but the difference in temperature between the hot and the cold ends of the couple. If the resistance wire between 5 and 9 has a positive temperature coefficient then the instrument will not even indicate temperature difference between the hot and cold ends of the thermocouple as increase in temperature of the cold end will be accompanied by increase in potential difference between 5 and 9 for a given current and the instrument will indicate less than the true difference in temperature for all cold end temperatures greater than that at which the indicator was calibrated.

It follows that if the arrangement of the resistances 10, 11, 12 and 13 can be so made that with the given current passing through them and also the indicator from the cell, the potential difference between 5 and 9 can be caused to change as the temperature of the resistances and the cold ends of the couple leads changes, by an amount equal to the change in the thermo E. M. F. of the couple due to such change in temperature, then the indicator will correctly measure the temperature of the hot end of the couple and will be without error due to changes in temperature of the cold end of the couple. This is accomplished by making the resistances as mentioned in the form of a bridge in which the legs 11 and 12 are composed of metal having a positive high temperature coefficient, such as nickel, and the legs 10 and 13 are composed of zero temperature coefficient wire, such as Constantan, Ideal or Advance. In such a bridge it is evident that with increase in temperature of the resistances, the difference in potential between 5 and 9 will decrease with a given current, and with proper proportioning of the resistances this decrease in potential difference can be made to equal the decrease in thermo E. M. F. of the couple and therefore the pyrometer will be self-compensating for changes in temperature of the cold ends of the couple.

In this pyrometer the current-measuring instrument which is also the instrument used to indicate the temperature of the couple is not operated by the thermo E. M. F. of the couple but by current from the independent source, and as a result of the construction and the arrangement of the connections used the indicator may be made to operate with as great E. M. F. at its terminals as may be necessary to its ruggedness and ability to withstand rough handling without decreasing its accuracy or permanence, but rather increasing these qualities.

The invention claimed is:—

1. The pyrometer of the potentiometer type comprising two opposing circuits, one circuit including in series a thermo-electric couple, a current detector and a bridge resistance connected in the circuit at two points; and the other circuit including in series the said bridge resistance connected in the circuit at two other points, a current meter, a rheostat, and a source of electric current.

2. A pyrometer of the potentiometer type comprising two opposing circuits, one circuit including in series a thermo-electric couple, a current detector and a bridge resistance; and the other circuit including in series the said bridge resistance, a current meter, a rheostat and a source of electric current, said common bridge resistance having legs of different temperature co-efficients of resistance.

3. A pyrometer of the potentiometer type comprising two opposing circuits, one circuit including in series a thermo-electric couple, a current detector, and a bridge resistance; and the other circuit including in series the said bridge resistance, a current meter, a rheostat and a source of electric current, said common bridge resistance having legs of different metals.

4. A pyrometer of the potentiometer type comprising two opposing circuits, one circuit including in series a thermo-electric couple, a current detector and a bridge resistance; and the other circuit including in series the said bridge resistance, a current meter, a rheostat and a source of electric current, with a resistance shunting said current meter, said bridge resistance being connected in the two circuits at opposite junctions.

5. A pyrometer of the potentiometer type comprsing two opposing circuits, one circuit including in series a thermo-electric couple, a current detector and a bridge resistance connected in the circuit at two points; and the other circuit including in series the said bridge resistance connected in the circuit at two other points, a current meter, a rheostat and a source of electric current, with a resistance shunting said current meter, said shunting resistance and all parts of the circuit in the measuring instrument being composed of metal having the same temperature co-efficient of resistance.

6. In a pyrometer of the potentiometer type, means for automatically compensating for errors in measurements due to changes in temperature of the cold end of the thermo-electric couple, consisting of a bridge resistance in the couple circuit, the balance or ratio of resistance of the limbs of which bridge varies with changes in temperature of the cold end of the couple.

7. In a pyrometer of the potentiometer type, two opposing circuits, a portion of each circuit being common, one circuit including a source of electric current and a bridge resistance, and the other circuit including said bridge resistance and a thermo-electric couple, the cold end of the thermo couple being connected to the bridge at two points having such relation that there will be a difference in potential between said two points when current passes through the bridge resistance from the source of current, and said bridge resistance having limbs in which the resistance changes differently in different limbs with changes in temperature.

8. In a pyrometer of the potentiometer type, two opposing circuits, a portion of each circuit being common, one circuit including a source of electric current and a bridge resistance, and the other circuit including said bridge resistance and a thermo-electric couple, one circuit being connected to the bridge resistance at two opposite junctions, and the other circuit being connected with the bridge resistance at the two other junctions.

HENRY J. BLAKESLEE.